United States Patent [19]

Gudaitis et al.

[11] Patent Number: 4,688,168

[45] Date of Patent: Aug. 18, 1987

[54] HIGH SPEED DATA TRANSFER METHOD AND APPARATUS

[75] Inventors: Donald A. Gudaitis, Euclid, Ohio; John P. McCaskey, Framingham, Mass.; Michael S. Hostetler, Twinsburg, Ohio

[73] Assignee: Picker International Inc., Highland Heights, Ohio

[21] Appl. No.: 644,023

[22] Filed: Aug. 23, 1984

[51] Int. Cl.⁴ .............................................. G06F 3/04
[52] U.S. Cl. ................................... 364/200; 364/134
[58] Field of Search ....................... 364/200, 900, 134

[56] References Cited

U.S. PATENT DOCUMENTS

| | | |
|---|---|---|
| 4,302,776 | 11/1981 | Taylor et al. . |
| 4,371,929 | 2/1983 | Brann et al. . |
| 4,371,932 | 2/1983 | Dinwiddle, Jr. et al. . |
| 4,373,183 | 2/1983 | Means et al. . |
| 4,378,588 | 3/1983 | Katzman et al. ............ 364/200 |
| 4,385,350 | 5/1983 | Hansen et al. . |
| 4,387,424 | 6/1983 | Frediani et al. ............ 364/200 |
| 4,387,425 | 6/1983 | El-Gohary . |
| 4,394,732 | 7/1983 | Swenson . |
| 4,412,286 | 10/1983 | O'Dowd et al. ............ 364/200 |
| 4,484,275 | 11/1984 | Katzman et al. ............ 364/200 |
| 4,494,192 | 1/1985 | Lew et al. ................... 364/200 |
| 4,545,043 | 10/1985 | Anderson et al. ........... 364/900 |
| 4,564,899 | 1/1986 | Holly et al. ................ 364/200 |
| 4,577,344 | 3/1986 | Warren et al. ............. 364/134 |

*Primary Examiner*—Gareth D. Shaw
*Assistant Examiner*—Randy W. Lacasse
*Attorney, Agent, or Firm*—Watts, Hoffmann, Fisher & Heinke Co.

[57] ABSTRACT

A high speed data transfer method and apparatus. A high speed data bus includes separate data transfer and master control bus portions. A system host computer loads a sequence of source and destination addresses corresponding to communications units coupled to the bus into memory in a bus master controller. The bus controller sequences through these address pairs at an aggregate rate greater than at least some of the devices' ability to transfer data to enhance data transmission speed on the bus. Bus cycles are allocated to devices on the bus according to a scheme dependent on those devices ability to utilize the bus. High speed devices are allocated a greater number of bus cycles per unit time than slower devices.

10 Claims, 8 Drawing Figures

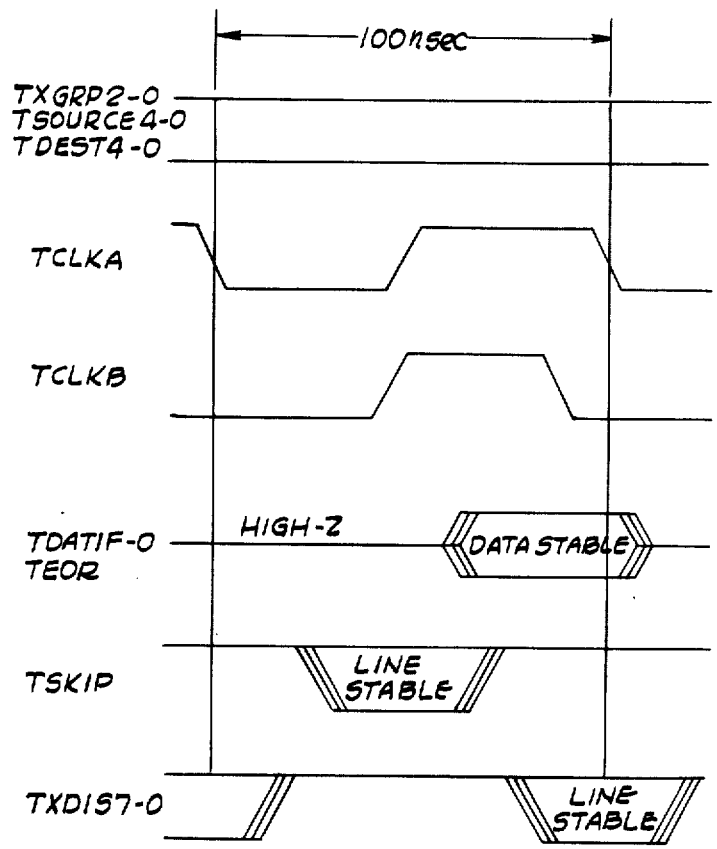

HIGH SPEED DATA TRANSFER METHOD AND APPARATUS

DESCRIPTION

1. Technical Field

The invention relates to method and apparatus for transferring digital data at enhanced rates and more particularly relates to a digital image transfer system for use in a medical imaging application.

2. Background Art

Digital imaging involves the acquiring, transferring, storing and retrieving of large amounts of digital image data quickly and economically. As an example, storage of 512×512×8-bit images at 30 frames per second (fps) is encountered in digital cardiac angiography. This requirement demands a continuous, data transfer rate of 8 megabytes per second (MB/s). Future systems capable of storing and viewing 1024×1024×10-bit images at 30 frames per second will demand 40 MB/s transfer rates. A system to meet these needs requires attention to effective transfer rate, storage capacity, and cost. Somewhat more subtle considerations are versatility in performing different applications, ability to store computer data as well as image data, reliability, and fault tolerance.

State-of-the-art medical imaging must accommodate a mixture of analog image data, digital image data, and digital computer data. The requirements of a digital angiographic system illustrates this point. An angiographic system includes an imaging camera which transmits analog image signals to a video tape or video disk storage unit or to an analog-to-digital converter so that digital signals corresponding to the analog image can be used by an image processor in displaying the image on a video monitor. The image processor is coupled to a control computer and conventional digital storage (disk drive) by a computer bus.

A system architecture in which the analog-to-digital converter, image processor, and storage devices are connected to a host computer bus suffers impaired performance. The bus usually has only enough bandwidth to support the computer's requirements. This bandwidth is usually less than the requirements of an imaging system. Adding more devices which must transfer data on the host computer bus reduces the share of the bus resource that the computer can obtain. This reduces the rate at which the computer can process data or access input/output devices. With conventional bus arbitration, time is lost during arbitration between the computer and added devices. This reduces the total available bus bandwidth. To avoid these problems demands a system-level approach which does not concentrate on computation, but on efficiently moving data between devices.

Selecting peripherals for multiple-megabyte high-speed data transfers must be done carefully. Semiconductor random access memory buffers offer adequate transfer rates but have low storage capacity and high cost. High-speed magnetic tape devices are presently expensive, unreliable and have awkward and slow record access. Optical disks are long range possibilities, but units that meet technical and cost requirements are not commercially available. Magnetic disks are readily available yet cannot provide the speed needed for real-time imaging.

Although a standard hard disk drive contains several magnetic heads, typically only one head can be accessed at a time. Widely used hard disks have peak data transfer rates of 1.2 megabytes per second. During continuous storage or retrieval (longer than a few milliseconds), a number of factors degrade performance to less than this rate so the effective transfer rate is typically 0.8 megabytes per second. Presently available disk drives are thus not suitable for the high transfer rates needed for real-time imaging.

DISCLOSURE OF THE INVENTION

Apparatus and method of the present invention provides data transfer rates adequate for real-time digital image transfers. Use of the disclosed method and apparatus, however, need not be limited to imaging since the system has applicability anywhere high speed or multiple concurrent data transfers are needed.

The invention has utility with any data transfer system having a number of units which must interchange data. By way of example, such a system may include a central processing unit, a number of disk drive units, and one or more imaging units. The invention features a system communication path and a bus controller. The system communication path couples the units to each other as well as to the bus controller. The bus controller affects data transfers among the number of units on the system communication path.

The communications path is characterized by separate data transfer and master control buses. The transfer bus is for transmitting data between the various units. The master bus is for transmitting control messages between individual units and a host computer. The data transfers are interleaved on the transfer path so that the data throughput along the transfer path is greater than the maximum data processing speed of at least some of the units coupled to the transfer path.

The means of achieving data throughput greater than the individual speed of a given unit connected to the transfer bus is to utilize multiple units in a system such that the aggregate rate of processing data approaches the sum of the individual unit data processing rates. Thus, even though one slow disk drive can only process data at the rate of about 1 megabyte per second, while the "slow" disk drive is processing data presented on the transfer bus, a second "slow" disk drive can process other data on the transfer bus. The processing of data can be either accepting data or presenting data.

In addition to providing this interleaving for high-speed transfers, the data transfer bus can support multiple concurrent data record transfers within totally separate groups of devices. Unlike the prior art, this is accomplished without significant degradation to the bus bandwidth.

The bus controller includes memory for storing a series of source and destination address pairs. The bus controller cycles through the source and destination address pairs telling each of the units coupled to the transfer bus when to transfer data. As an example, if data is to be transmitted from a plurality of disk drives to an image processor at a high rate of speed to achieve real-time imaging, the bus controller will indicate a number of different sources for data and a single destination, i.e. the image processor. In this way, the aggregate data transfer rate to the image processor is the product of the rate of the slowest disk drive and the number of source disk drives in the system.

In a preferred system, each of the units coupled to the data transfer path has its own controller which receives control commands from the master bus. These units must include a mechanism for knowing when they are to be sending data or when they are to be receiving data via the transfer bus. Details of this control mechanism will be described in conjuction with the preferred embodiment of the invention.

The invention has particular applicability to an imaging system. The dual path data transmission architecture eliminates inefficiencies characteristic of prior art data interfacing. Each of the imaging system units is directly coupled to both the transfer and master buses. All units have fixed master bus addresses. However, a unit's source and/or destination address (es) on the transfer bus are programmable, and are assigned by the host computer. The host initializes each of the units via the master bus. The host computer also programs the bus controller and then gives control of the data transmission to the bus controller. Once a desired data record transmission has been accomplished, all units and the bus controller await instructions from the host computer before the next transmission occurs.

Unlike certain prior art communication systems, the bus controller does not attempt to resolve data transmission requests on a first-come-first-serve or priority system. Instead, the bus controller is told in advance the priority of data transmissions and those transmissions occur in an orderly fashion. This prioritizing of data transfers places some of the burden on the program coordinating the transfers but results in extremely high rates of data throughput.

The disclosed system can re-allocate the data path resources if certain units cannot keep up with the transfer pace originally allocated. This re-allocation is achieved by giving each of the units on the transfer bus an opportunity to indicate to the bus controller that it is not ready to perform the data transmission it has been instructed to perform. If the bus controller senses a unit coupled to the transfer bus that is not ready, it does not allocate access to the transfer bus to the non-responsive unit.

From the above it should be appreciated that one object of the invention is a high-speed data transmission method and apparatus which has particular utilization in an imaging system. Other aspects, advantages and features of the invention will become better understood when a detailed description of a preferred embodiment of the invention is described in conjunction with the accompanying drawings.

BRIEF DESCRIPTION OF THE DRAWINGS

FIG. 7 shows the logical organization of a sequence of memory locations inside the FIG. 4 bus controller to designate transfers along the transfer bus; and FIG. 8 depicts timing relationships for data on the transfer bus.

BEST MODE FOR CARRYING OUT THE INVENTION

Figure 1:
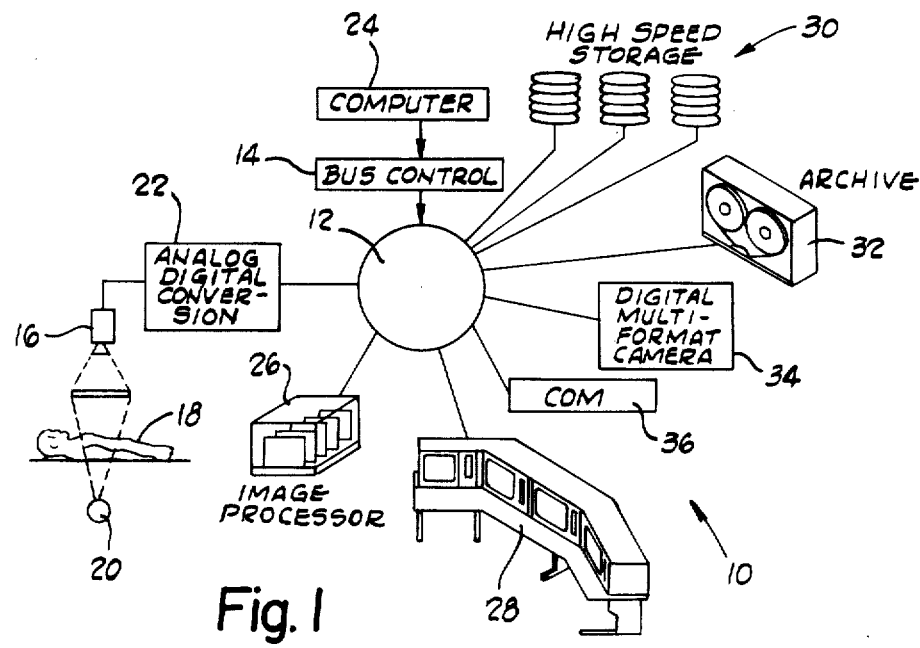
FIG. 1 is a pictorial representation of an imaging system utilizing a communications path in accordance with the invention.

Turning now to the drawings and in particular FIG. 1, there is illustrated an angiographic imaging system 10 utilizing a high-speed communications path 12 to transfer data between various units in the system 10. The transfer of data along the path 12 is controlled by a bus control unit 14.

The angiographic system 10 incorporates a camera 16 for acquiring image data of a subject 18 exposed to a source 20 of radiation. Analog outputs from the camera 16 are converted by a conversion unit 22 into digital data signals which are coupled to the communications path 12. These digital signals are then transferred to one of a number of other units also coupled to the path 12.

A computer 24 determines which of the other units coupled to the communications path 12 receive the output from the conversion unit 22 by sending control signals to the bus control unit 14. Real-time imaging of the output from a camera 16 is possible by coordinating transfer of digital signals from the conversion unit 22 to an image processor 26 and to a video display 28. As an alternate data path, the digital signals can be transmitted via the path 12 to either high-speed storage devices 30 such as a number of magnetic disk drives or an archive unit 32. The versatility of this system configuration allows the digital output from the converter 22 to also be directly coupled to a multi-format camera 34 or a high-speed communications transmitter 36 for sending the image data to a remote location.

The FIG. 1 disclosure illustrates the flexibility of the high-speed communications path 12 and the advantages this system exhibits over prior art techniques. Rather than stringing together a number of poorly matched data transmission paths, each of them requiring an interface with resulting loss in throughput, the FIG. 1 system couples each of the units together through one interface, i.e., the high speed path 12.

Figure 2:
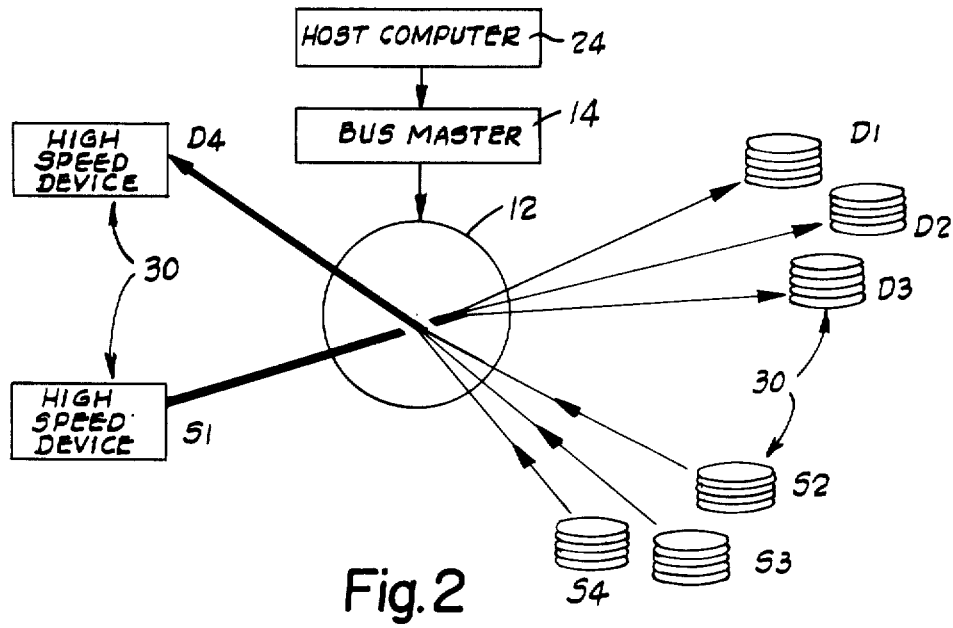
FIG. 2 illustrates the fundamental operational capabilities of the disclosed communications path.

Fundamental capabilities of the communications path 12 are shown in FIG. 2. This diagram shows how two simultaneous but independent data records can be transferred. A data record from a high-speed device S1 can be transferred to three slower disk drives D1, D2, D3 in a process called interleaving. Similarly three slower disk drives S2, S3, S4 can transfer another data record to a higher-speed device D4 is a second interleaved process. These two independent interleaved processes share the path 12 by being active on alternate cycles in a process called interlacing.

Figure 3:
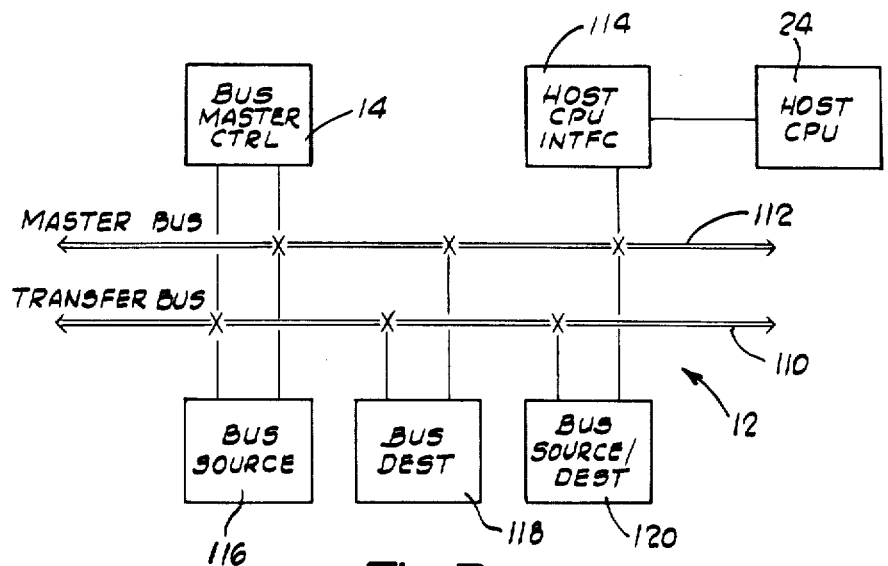
FIG. 3 illustrates the division of duty between data signal transmission and control signal transmission to units coupled to the communications path.

In FIG. 3, the communications path 12 is seen to include a data transfer bus 110 and a master control bus 112. The bus control unit 14 interfaces with each bus portion 110, 112 while the host central processing unit 24 is shown coupled to the master bus 112 through a host interface unit 114. In operation, the host processing unit 24 transmits control signals via the interface 114 to the bus control unit 14 along the master bus 112. After loading the control sequence into the control unit 14, the host 24 signals the bus controller unit 14 to take control of the transfer bus 110 and coordinate data transfers among the three units 116, 118, 120 shown coupled to the transfer bus 110. Each of the units 116, 118, 120 is given an address which in a preferred embodiment of the invention is designated with a 5-bit address designation which is stored in the bus control unit 14.

Each of the units 116, 118, 120 is tied to both the transfer bus 110 and the master bus 112. Each unit need not be capable of both reading and writing data on the transfer bus 110. Thus, a first unit 116 can only write data to the transfer bus 110 in response to control signals from the bus control unit 14. This unit 116 might therefore be analogous to the analog-to-digital converter 22 shown in FIG. 1. A second unit 118 can only receive information from the bus 110 under control of the control unit 14. This unit therefore might correspond to the digital multi-format camera 34 shown in FIG. 1. The third unit 120 can both read and write data to the transfer bus 110 and therefore could correspond to the communications adapter 36 or high-speed storage unit 30 in FIG. 1.

While only three units 116, 118, 120 are shown in FIG. 3, the FIG. 1 illustration should make clear the fact that multiple units can be attached to the bus. In the preferred embodiment of the invention, the transfer bus can support up to 512 logical devices, which can be divided into as many as 8 independent transfer groups. In each transfer group there can be 32 source devices and 32 destination devices.

A data source such as the unit 116 requires an interface for accepting control commands from the host computer 24 via the interface 114 as well as an interface to present data to the data transfer bus 110. The interface must also be capable of receiving control signals from the bus control unit 14 and acknowledging receipt of these signals. A destination unit 118 must provide data buffering and any data processing required for receipt of that data from the transfer bus 110. A combination source and destination unit 120 must perform all of these functions in response to control signals from the bus control unit 14.

In a preferred embodiment of the invention, at least one source unit and at least one destination unit transfer 32 bits of data during one bus timing cycle. These two devices form a transfer pair in a bus controller master transfer table 122 (FIG. 7). Transfers on the transfer bus 110 can involve a single transfer pair that is repeatedly directed to transfer 32 bits of data until transmission of the data record is complete. In this case, the data rate is limited by the slower of the two devices forming the transfer pair.

Interleaving

If a higher speed of data transfer is required, multiple devices can be used to obtain data rates that are multiples of a base rate corresponding to the rate of the slowest device utilized. This speed enhancement is accomplished by interleaving data between devices. A set of devices used in an interleave sequence is a transfer group. Table I below illustrates the enhanced data rate possibilties when such interleaving is utilized. In the example, the source device bandwidths are each 1 MB/sec while the destination device bandwidth is at least 3 MB/s.

TABLE I

| DATA RATE | SOURCES | DEST | TRANSFER | SEQUENCE |
|---|---|---|---|---|
| 1 MByte/sec | 1 | 1 | S(1) | D(1) |
|  |  |  | S(1) | D(1) |
| 2 MByte/sec | 2 | 1 | S(1) | D(1) |

TABLE I-continued

| DATA RATE | SOURCES | DEST | TRANSFER | SEQUENCE |
|---|---|---|---|---|
|  |  |  | S(2) | D(1) |
|  |  |  | S(2) | D(1) |
| 3 MByte/sec | 3 | 1 | S(1) | D(1) |
|  |  |  | S(2) | D(1) |
|  |  |  | S(3) | D(1) |
|  |  |  | S(3) | D(1) |

A fundamental requirement of interleaving is that the sequencing of data transfers in the table be preserved. The sequence may be repeated or suspended while waiting for a device but it cannot be altered. The ordering or sequencing of transfer devices used in an interleave sequence is designated in a transfer group table. FIG. 7 illustrates one example of such a transfer group table. Each entry in a transfer group table has eleven bits with five bits designating a destination address, 5 bits designating a source address, and a single bit indicating the end of a transfer group. This 11-bit entry is loaded from the host computer 24 into a memory in the bus control unit 14 via transfers on the master bus 112. In a preferred embodiment each transfer group is implemented with a 128 by 11 bit memory section. The bus control unit 14 sequences through each entry of a transfer group table until an end-of-group bit equal to "1" is reached. When this occurs, the bus control unit 14 knows it has reached the last element in the group and that a transfer group table pointer should be reset to the beginning of the table.

Interlacing

In a preferred embodiment of the invention, the host computer 24 can load transfer pairs for as many as eight transfer groups. By definition, no device on the bus 12 can be a member of more than one transfer group at a time. The bus can be shared by multiple transfer groups involving independent data records. The transfer bus 110 is shared between each transfer group. This time-sharing is implemented by granting a predetermined number of bus cycles to each transfer group. This sequencing of transfer groups is called interlacing.

Figure 4:
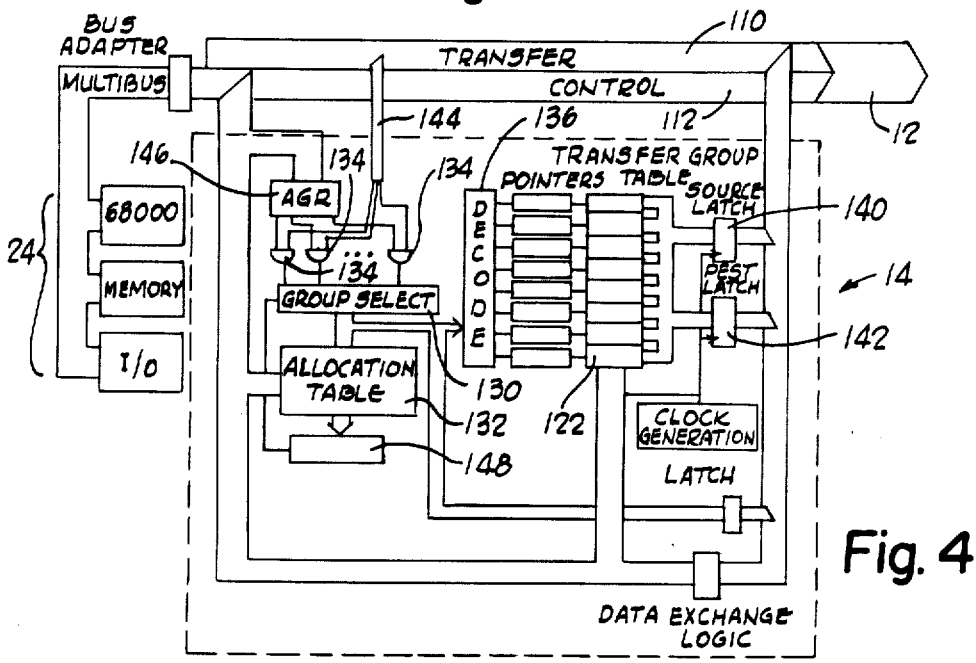
FIG. 4 illustrates the organization of a bus controller for coordinating transfers along a transfer bus shown in FIG. 3.

On every bus cycle transfer, a transfer group programmable array logic 130 (FIG. 4) determines which one of the eight groups will be active during the next succeeding bus cycle. The logic 130 cycles the active transfer groups in response to inputs from a bus allocation table 132 and a number of AND gates 134.

An output from the group array logic 130 is coupled to a decoder 136 which enables the appropriate transfer group pointer which points to the next RAM address of the next transfer in the transfer table 122.

Table II below illustrates signal definition for signals appearing on the data transfer bus 110. The mnemonics chosen for this table identify these signals as to function as well as order or position within a group of signals.

TABLE II

| Mnemonic | Transfer Bus Signals | | |
|---|---|---|---|
|  |  | Number of Lines | Description |
| TDAT1F-TDAT0 | (H) | 32 | Data |
| TXGRP2-TXGRP0 | (H) | 3 | Transfer group select |
| TSOURCE4-TSOURCE0 | (H) | 5 | Source address within selected transfer group |
| TDEST4-TDEST0 | (H) | 5 | Destination address within selected transfer group |
| TCLKA | (H) | 1 | Bus timing clock A |

TABLE II-continued

| Mnemonic | Transfer Bus Signals | | |
|---|---|---|---|
| | | Number of Lines | Description |
| TCLKB | (H) | 1 | Bus timing clock B |
| TXDIS7-TXDIS0 | (L) | 8 | Transfer group disables (open collector) |
| TSKIP | (L) | 1 | Cycle skip request (open collector) |
| TEOR | (L) | 1 | End of record status |

A timing diagram for a single bus cycle of 100 nanoseconds is shown in FIG. 8. At the beginning of each bus cycle, a source and destination latch 140, 142 (FIG. 4) coupled to the transfer table 122 present address information to the transfer bus 110. The transfer group address is presented via a latch from the group select logic 130. These address fields specify devices that will be transferring data during a bus cycle. If either a source or destination device is not ready to transfer data, a skip line TSKIP on the transfer bus 110 must be asserted (low) by the particular source or destination which is not ready to accept or present data. By accomplishing this early in the bus cycle, any device which is not ready notifies the bus controller 14 as well as other devices on the bus that the transfer will not occur and a null cycle can be expected.

If all devices involved in the transfer are ready, the source device designated in the source latch 140 places data on the data bus 110 when the signal TCLKA goes high. The destination device latches onto this data at the falling edge of the TCLKB signal. Once the transfer of the entire data record is completed, an end of transfer line TEOR is asserted (low) by either the source or destination unit to signal the bus controller 14 that the transfer has been completed. The status of this end of transfer TEOR and the earlier mentioned skip line TSKIP designate to the bus controller 14 the status of a particular bus cycle.

During the 100 nanosecond bus cycle, the bus controller 14 examines eight TXDIS lines 144 (FIG. 4) corresponding to the eight transfer groups that make up the preferred system. If any line is asserted (low), additional bus cycles are not allocated to the group corresponding to this line until the line again goes high.

During every transfer cycle the group selector 130 determines which of the eight groups will utilize the next bus cycle. The selector 130 cycles through the groups depending on the inputs from the AND gates 134 which in turn depend on the eight TXDISx lines 144 on the transfer bus 110 and the active group register 146.

An asserted (low) signal from either the active group register 146 or the TXDISx line will cause the AND gate output for that group to go low and cause the corresponding transfer group to be excluded from the interlace sequence. The bus allocation table 132 is an eight-location memory used to specify the number of bus cycles allocated to a group on the transfer bus. There is one entry in this table for each transfer group. This table 132 operates with the active group register 146 and transfer group disable (TXDISx) lines 144 to provide decision information to the group selector 130.

Operation of the allocation table 132 is as follows:

A. The host computer 24 loads the allocation table 132 with the number of bus cycles to be allocated to each transfer group.

B. The host computer 24 loads the active group register 146 with a bit map indicating which transfer groups are to be given bus cycles.

C. The eight transfer group disable lines (TXDIS7 through TXDIS0) are ANDed with the active group register output lines, producing signals which indicate whether bus cycles should actually be allocated for each transfer group.

D. The group selector 130 receives these signals and uses them to generate a 3-bit code which specifies the next transfer group to be allocated cycles on the bus. A transfer group is, thus, given cycles on the bus only when it is enabled by the host and is ready to transfer as indicated by its TXDISx line.

E. The 3-bit next transfer group code is used to enable the actual transfer group by the decoder 136 and indexes into the allocation table 132. This table 132 then outputs a count indicating the number of bus cycles to be allocated to the group.

F. This count is immediately loaded into a down counter 148, which then counts down as each bus cycle is allocated for the transfer group.

G. When the counter 148 reaches zero, a signal is sent to the group selector 130 to cause it to proceed to a next active transfer group as indicated by the output of the AND gates 134.

With the allocation table 132 any number of bus cycles can be granted to a transfer group. This allows for higher-speed transfer groups to be allocated more bus cycles than lower-speed groups, and eliminate bottlenecks on the transfer bus 110. A preferred embodiment has two allocation tables 132. This allows the host processor 24 to update one while the other is in use.

Figure 5:
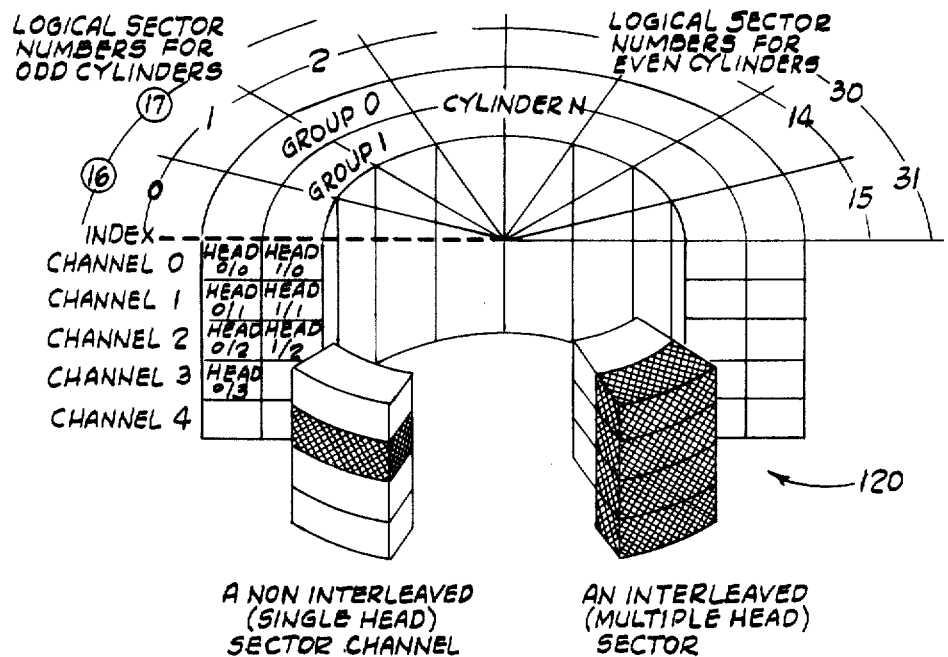
FIG. 5 shows the organization of data on a hard disk drive used for storing data transferred along the transfer bus.

The invention has utility in enhancing data transfer involving a hard magnetic disk drive. The data organization 120 of a seven head disk drive Winchester unit from Megavault of Woodland Hills, Calif. is shown in FIG. 5. This drive has been modified in a way not relevant to the invention to allow access to the seven heads in two groups, one set of four heads and a second set of three heads.

Each read/write head is identified by a channel number and a set number. A channel comprises all the heads that can be accessed through one storage module drive (SMD) type B connector. A set is the group of heads that can be accessed simultaneously through multiple SMD type B connectors.

Figure 6:
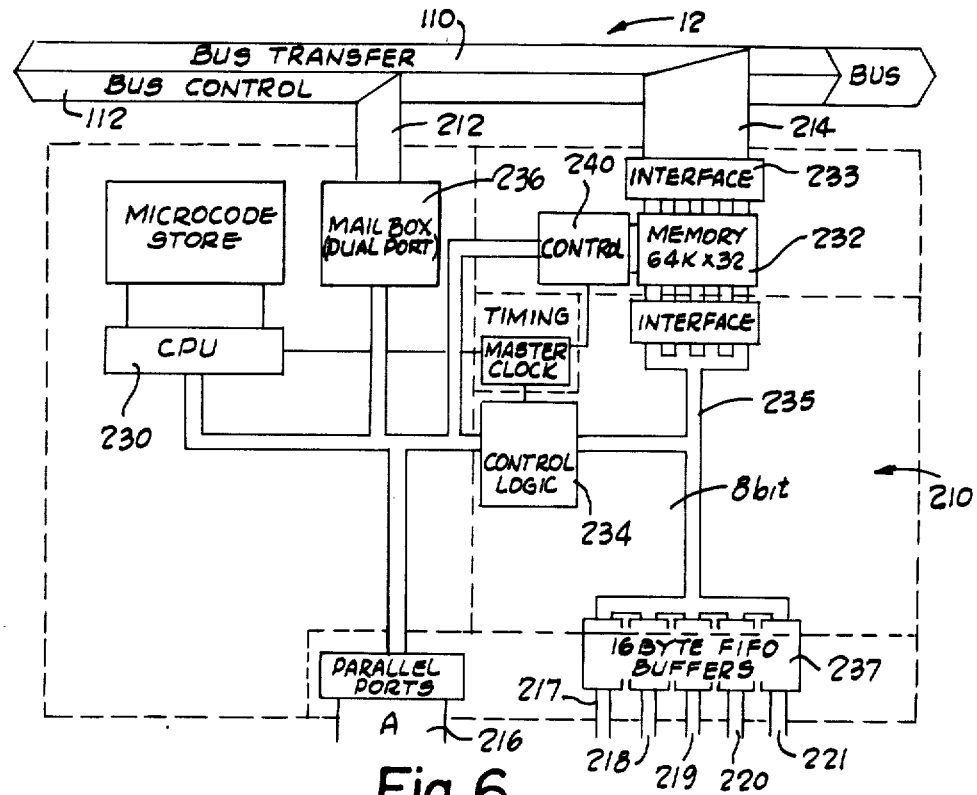
FIG. 6 schematically illustrates the organization of a controller unit for storing data on a disk drive.

FIG. 6 illustrates an interface 210 between the bus 12 and the disk drive 120. There are two interconnections 212, 214 from the bus 12 to the interface 210 and six interconnections 216-221 from the disk drive 116 to the interface 210. A parallel port input 216 labeled A corresponds to a standard type A storage module drive (SMD) connector for transmitting control signals to the drive. These control signals are generated by a controller central processing unit 230 which in a preferred embodiment is a bit-slice controller programmed using microcode instructions.

The interface 210 can direct data to five disk drive channels through five type "B" connectors 217-221. With a four channel drive, the fifth controller channel is used as a backup.

Data is transferred to and from the disk drive channels via a RAM FIFO memory 232 which is organized as 64K×32 bits. The 32 bits from the transfer bus 110 are loaded into this memory 232 from a latch interface 233. The 32-bit data from memory 232 is divided into four 8-bit bytes and directed to the disk drive heads through one of the SMD type B connectors 217-221 by control logic 234. The control logic 234 uses an 8-bit data path 235 to pass data between the RAM memory 232 and five 16 word×8-bit FIFO buffers 237 coupled to the SMD type B connectors.

The host computer 24 directs control signals into a scratchpad mailbox 236 which transmits control instructions to the microcode central processing unit 230. The host computer 24 also loads a sequence of transfer instructions into the bus controller 14 telling the bus controller 14 to access a particular disk drive for a data transfer. This can be for either writing to a disk drive or reading from a drive.

When the transfer group to which the drive belongs is accessed by the bus controller 14, the disk drive will hopefully be ready to send or receive data since by this time the microcode controller 230 will have either accessed the, heads on the drive to fill up the RAM buffer 232 or will have alternately enabled the RAM controller 240 to receive data from the transfer bus.

When the disk controller is addressed, the sending or receiving of data can be achieved by the RAM controller 240 by either emptying or filling a portion of the FIFO RAM 232. If the disk drive controller is addressed and is not ready to transfer data, the interface 210 can exert a skip cycle causing the bus controller 14 to skip to the next transfer.

The control unit 240 monitors the condition of the memory 232 and can detect if the memory is full and cannot receive additional data or is empty and has no data to transmit. Under these circumstances when the address for the interface 210 is generated and transmitted by the bus controller 14, the control unit 240 activates the TSKIP (L) signal via the interface 233 to the transfer bus 110. The control unit 240 also controls generation of a group disable signal (TXDISx) which results in removing its associated transfer group from the bus allocation scheme.

Since the data access rate of each disk drive 120 on the transfer bus is less than the maximum bus transfer rate, multiple drives with multiple interfaces 210 identical to that seen in FIG. 6 can be utilized. Thus, each of these interfaces 210 will monitor the transfer bus 110 for its source or destination address and either be ready to transfer data or activate its skip line (TSKIP) and/or its group disable line (TXDISx). When multiple numbers of these disk drive interfaces 210 are utilized with the bus 12, the data transfer rate achievable on the bus is sufficient to allow an image processor to do real time data transfer by interleaving data with these drives.

Although the present invention has been described with a degree of particularity, it is the intent that the invention include all modifications and/or alterations from the disclosed embodiment falling within the spirit or scope of the appended claims.

We claim:

1. A data communication system for transferring data at an enhanced data transfer rate comprising:
   (a) a dual transmission bus, said bus having a data portion for the transmission of digital data messages and a control portion for allocating the transmission of data messages on the bus data portion;
   (b) a plurality of communications units coupled to the transmission bus, each of said communications units including a data interface coupled to the data portion of said transmission bus;
   (c) a bus controller for coordinating data transmission on the bus between said communications units; said bus controller including (i) address control means having an address input coupled to the control portion of said bus and an address output coupled to said bus data portion for presenting source and destination addresses on the data portion of the bus; said address control means organized into one or more data transfer groups wherein each one of said data transfer groups includes multiple source and destination pairs, said source and destination pairs organized within a group to interleave data transfers between communications units within a transfer group to achieve a data transmission bandwidth greater than the maximum continuous data transfer bandwidth of one or more of the communication units in the transfer group; and (ii) means for allocating bus cycles to the data transfer groups within the address control means; and
   (d) programming means coupled to the control portion of the bus for transmitting said multiple source and destination pairs to said address control means.

2. The data processing apparatus of claim 1 wherein the means for allocating comprises mean for skipping a data transfer within a transfer group in response to a status signal from one of the communications units indicating said one unit is not ready to participate in a data transfer.

3. The data communication system of claim 1 wherein each of said communications units has an associated controller to coordinate the sending or receiving of data to or from said data portion in response to the receipt of one of said source or destination addresses on said data portion.

4. The data communications system of claim 1 wherein said means for allocating includes (i) logic means coupled to the data portion of said bus for determining an active transfer group in response to a signal on the data portion from one of said communications units (ii) an allocation table coupled to the control portion of the bus to store bus cycle allocations from the programming means; and (iii) decoder means coupled to the logic means and the allocation table to index into the address control means and cause said address control means to present source and destination addresses from an active transfer group to the address output.

5. The data communications system of claim 4 wherein the data portion of said bus comprises a group disable line corresponding to each transfer group and wherein each group disable line is tested by the logic means in determining an active transfer group.

6. The communications system of claim 1 wherein one or more of said comnunication·units form a source of digital imaging data, said imaging data corresponding to discrete regions of an image; and wherein one or more of said communications units form an imaging device for displaying an image generated from said digital imaging data.

7. A method for allocating transfers between a plurality of communications units coupled to a data transfer path comprising the steps of:
   assigning a first set of communications units to multiple source and destination address pairs to form a first data transfer group;
   assigning a different set of multiple communication unit source and address pairs to one or more additional data transfer groups;
   allocating each said data transfer group one or more cycles on the transfer path;

determining an active group and directing a data transfer for a source/destination pair in said active group by presenting source and address pair information on the data transfer path;

counting said transfer and comparing said count to the number of cycles allocated for said active group; and, redetermining an active data transfer group based upon said comparison and a monitoring of the status of said transfer path and directing further data transfers between communications units of an active data transfer group.

8. The method for allocating transfers of claim 7 where the assigning steps organize successive transfers to originate or end at multiple communications units communicating with a single or multiple other communications unit(s) to interleave data transfers within a group thereby achieving a transfer rate greater than a transfer rate of at least one of said multiple communications units.

9. The method of claim 7 wherein at least one set of said communications units assigned to a transfer group comprises an imaging device and multiple storage devices for storing image data and the multiple source and destination pairs are interleaved to cause data to be transferred to the imaging device at a rate faster than the maximum data processing speed of the multiple storage devices.

10. A bus allocation controller for directing a sequence of data transfers between pairs of communications units coupled to a data bus comprising:

a memory unit organized into independent data transfer groups of source and destination device pair designations;

interface means for coupling a selected one of said source and destination pair designations to said bus to apprise a source and destination communications unit corresponding to the source and destination device pair designation to transfer data on the data bus;

controller means for programming the series of source and destination pairs in the memory unit to achieve a data transmission bandwidth greater than the maximum continuous data transfer bandwidths of said source and destination devices within each independent data transfer group; and group allocation means coupled to the memory unit to allocate bus cycles between said independent data groups on a shared basis.

* * * * *